(12) United States Patent
Wark

(10) Patent No.: US 10,285,337 B2
(45) Date of Patent: May 14, 2019

(54) COMPACT PLANT ENCLOSURE

(71) Applicant: Christopher Garrison Wark, New York, NY (US)

(72) Inventor: Christopher Garrison Wark, New York, NY (US)

( * ) Notice: Subject to any disclaimer, the term of this patent is extended or adjusted under 35 U.S.C. 154(b) by 420 days.

(21) Appl. No.: 15/169,243

(22) Filed: May 31, 2016

(65) Prior Publication Data
US 2017/0339845 A1 Nov. 30, 2017

(51) Int. Cl.
*A01G 9/16* (2006.01)

(52) U.S. Cl.
CPC ............ *A01G 9/16* (2013.01); *Y02A 40/254* (2018.01)

(58) Field of Classification Search
CPC ...... A01G 9/14; A01G 9/1438; A01G 9/1469; A01G 9/16; A01G 9/18; A01G 9/20; A01G 9/22; A01G 9/24; A01G 9/241; A01G 9/242; E04D 1/30; E04D 13/0325; E04D 13/035; E04D 3/44; E04D 3/4618
USPC .... 160/88, 101, 102, 105; 47/17, 20.1, 23.1, 47/29.1, 29.2, 29.3, 29.5; 52/DIG. 17, 52/63, 222
See application file for complete search history.

(56) References Cited

U.S. PATENT DOCUMENTS

| | | | |
|---|---|---|---|
| 1,954,674 A * | 4/1934 | Lager | A01G 9/24 47/17 |
| 3,562,972 A * | 2/1971 | D'Amato | A01G 9/16 52/66 |
| 4,038,791 A * | 8/1977 | Atkinson | A01G 9/14 312/102 |
| 4,242,833 A * | 1/1981 | Maes, Jr. | A01G 9/22 47/17 |
| 4,316,405 A * | 2/1982 | Esposito | A01G 9/24 454/253 |
| 4,601,139 A * | 7/1986 | Esposito | A01G 9/14 52/93.1 |
| 4,817,655 A * | 4/1989 | Brooks | E04H 15/58 135/119 |
| 4,853,264 A * | 8/1989 | Vincent | E06B 3/66 428/34 |
| 5,242,004 A * | 9/1993 | Stilling | E04B 7/00 135/117 |
| 6,338,226 B1 * | 1/2002 | Gauthier | A01G 9/14 52/63 |
| 7,748,162 B1 * | 7/2010 | Necessary | A01G 9/16 47/17 |

(Continued)

*Primary Examiner* — Joshua E Rodden

(57) ABSTRACT

The present invention is a compact plant enclosure intended for use in locations with peripheral space restrictions. The top and one side of the enclosure form a continuous curved face which consists of multiple translucent flexible access panels that can be slid along guide channels incorporated into the sides of the curved frame components on either side of the flexible panels. The guide channels and flexible panel edges may incorporate retention features that limit the lateral movement of the flexible access panels. The opposing wall may include a single translucent vertical panel or multiple vertical access panels. The remaining two vertical sides of the plant enclosure each consist of a fixed, translucent rigid panel. In another embodiment of the present invention, multiple distinct intermediate segments of the enclosure are defined by interstitial curved and vertical frame components supporting adjacent sets of flexible access and opposing vertical panels.

10 Claims, 7 Drawing Sheets

(56) References Cited

U.S. PATENT DOCUMENTS

| | | | |
|---|---|---|---|
| 8,915,015 B1 * | 12/2014 | Augspurger | A01G 9/14 47/17 |
| 2008/0028700 A1 * | 2/2008 | Wu | A01G 9/16 52/200 |
| 2016/0120135 A1 * | 5/2016 | Herrick | A01G 9/16 47/17 |

* cited by examiner

COMPACT PLANT ENCLOSURE

TECHNICAL FIELD

The present invention relates generally to enclosures for growing plants, and more specifically to compact greenhouses or applications in which plant enclosure access is limited by height or peripheral clearance.

BACKGROUND

Enclosures for vegetation are found in a wide range of sizes. The largest are large-volume commercial green houses that can cover several acres and the smallest have volumes in the range of several cubic centimeters. All of them are intended to provide a controlled or protected environment for plant growth, such as allowing year-round growth where the enclosures are temperature controlled, providing a passively solar-heated environment in early or late growing seasons when frost is a threat, providing protection from weather extremes, or providing protection from harmful airborne organisms, insects and other pests. The type of access incorporated into these enclosures is typically determined by their size and purpose. Green houses that cover more than 10 square meters are usually a walk-in type enclosure whereas enclosures where the entire growing area can be reasonably reached from the outside of the enclosure have some type of access panel or sheet and are often limited in height to one to two meters. These types of enclosures are very often constructed of flat panels with access doors that swing out. Other compact configurations are in the form of a cold frame in which access to small plants is achieved by removing the entire enclosure. In locations where access spaces are limited, such as balconies, the enclosure may only be accessible from one side and in windy locations, such as rooftops, cubic enclosures with hinged access panels can be impractical. This type of construction can also add to the cost of the enclosure and rely on metal frame construction that can reduce the effective insulative properties of the panels.

Several patents issued for greenhouses and plant enclosures address versatility and economy. Means for constructing and expanding light-weight and portable greenhouses of various sizes and configurations is presented in U.S. Pat. No. 6,892,743. Another patent, U.S. Pat. No. 2,691,848 describes a small, frameless plant protector. U.S. Pat. No. 7,036,270 describes a mobile application. Quonset-type semi-cylindrical construction has been long recognized as an economical and durable building concept, particularly in harsh weather conditions, and is applied to walk-in greenhouses in U.S. Pat. No. 5,333,421. Similarly, a form of walk-in greenhouse or sunroom with an overall quarter-cylinder shape intended to be located against a wall or other vertical structure is described in U.S. Pat. No. 4,018,213. Since some form of insulation is a desirable feature for greenhouses in many climates, insulative transparent or translucent corrugated and double-wall plastic sheets that are flexible enough to conform to the curved frame of a semi-cylindrical plant enclosure are commonly used. However, they typically have a bending radius not small enough to accommodate compact plant enclosures.

Patents have also been issued which include means of plant enclosure access without relying on swinging doors or panels. One configuration presented in U.S. Pat. No. 4,051,626 utilizes horizontally sliding access panels. A method applied to compact semi-cylindrical greenhouses as shown in U.S. Pat. No. 4,671,011 has a split cover with one half side on a hinge such that it can be rotated open exposing half the enclosed space. This patent additionally describes a form of the invention which is modular with a rotating cover for each of the modules in series. Another method for accessing a low-profile semi-cylindrical greenhouse is to simply lift or fold open the transparent sheet that forms the skin of the greenhouse as shown in U.S. Pat. No. 6,185,877. This method is simple and economical, but the sheet covering can deform fairly quickly and tends to have poor insulating qualities. Another similar method for accessing semi-cylindrical greenhouses is presented in U.S. Pat. No. 6,282,834, except that in this invention, a mechanism is utilized to roll up an insulating sheet. Yet another method for rolling up the greenhouse covering using a framed sheet that rides in grooves in the greenhouse structure is described in U.S. Pat. No. 5,216,834. In the cases where the roof covering is a sheet that can be rolled up, a dedicated mechanism is required to support the sheet. A method for eliminating such mechanisms is to form the cover with a material that is rigid, thus self-supporting, in the horizontal direction but flexible along the curve of the enclosure. A familiar example is a tambour door as utilized in a roll-top desk or a chest as described in U.S. Pat. No. 5,494,181.

The present invention addresses the problem of potential damage or dislocation by high winds or storms by incorporating a curved shape to the upper portion which allows stability in high winds when the back of the enclosure is located against a wall or two identical enclosures are located back-to-back, while also providing the possibility of more vertical internal space for a given floor area than what is possible with a quarter-cylinder or semi-cylindrical form.

The present invention addresses the problem of limited access clearance by eliminating rigid swinging access panels.

The present invention addresses the issue of access relying on covers that require extra dedicated structural elements by incorporating sliding panels that are flexible in a longitudinal direction and generally rigid and restrained in a lateral direction such that they add structural stability to the plant enclosure frame.

The present invention addresses the issue of enclosure insulation by providing means of construction using insulating translucent access panels with a small bending radius, insulating translucent fixed panels and non-metallic framing.

The present invention addresses the issues of enclosure system cost and complexity by incorporating all desirable features in very few elements that can be produced entirely from inexpensive materials, including, but not limited to, polycarbonate, polyethylene, polypropylene, PVC, and recycled forms of these plastics.

Another form of the present invention also addresses the issues of enclosure system cost and complexity by providing a means of multiplying the effective width of an enclosure.

SUMMARY OF THE INVENTION

In one embodiment of the present invention, a stationary plant enclosure comprises a support frame and panels that define the bottom and as many as four other faces of the enclosure. The top and one side of the enclosure form a continuous curved face which comprises multiple translucent flexible access panels. The remaining vertical sides of the plant enclosure may each comprise a translucent rigid, fixed panel. Support and longitudinal positioning for the flexible access panels are provided by guide channels incorporated into the curved support frame components on either side of the flexible panels. The desired radius of the curved portion of the enclosure is largely determined by the requirements of the enclosed plants, the mechanical bending radius limit of the flexible panels, and any other application-specific requirements. The flexible access panels can be moved along the curved support guide channels by means of handles attached at a longitudinal end of each access panel to provide openings to the enclosure thus allowing access to the enclosure for the purpose of inserting or removing plants, maintaining plants or irrigation equipment, providing ventilation for the enclosed plants, or controlling the temperature within the enclosure.

In another embodiment of the present invention, the enclosure face opposing the lower portion of the curved face is comprised of multiple vertical access panels.

In yet another embodiment of the present invention, the guide channels of a curved support incorporate perpendicular retainer extensions and the flexible panels further comprise retention tabs attached to the edges of the flexible panels and locate within a guide channel such that the lateral movement of a flexible access panel is limited in both non-longitudinal axis directions.

In yet another embodiment of the present invention, multiple distinct intermediate segments of the enclosure are defined by interstitial curved supports located between adjacent sets of flexible access panels and interstitial vertical supports co-planar with the interstitial curved supports and located between adjacent vertical panels.

In yet another embodiment of the present invention, flexible access panel retainer features and a side panel groove are incorporated into both opposing sides of a curved support.

Other systems, methods, features, and advantages of the present invention will be, or will become, apparent to one having ordinary skill in the art upon examination of the following drawings and detailed description. It is intended that all such additional systems, methods, features, and advantages be included within this description and scope of the present invention.

BRIEF DESCRIPTION OF THE DRAWINGS

The invention can be better understood with reference to the following drawings. The elements in the drawings are not necessarily to scale, emphasis instead being placed upon clearly illustrating the principles of the present invention. Moreover, in the drawings, like reference numerals designate corresponding parts throughout multiple views. The orientation of the present invention as presented in the drawings and detailed descriptions of the invention that refer to orientation are for reference purposes. In use, it is understood that the invention could be oriented in any position on the generally horizontal plane referenced in the detailed description and drawings.

DETAILED DESCRIPTION

Figure 1:
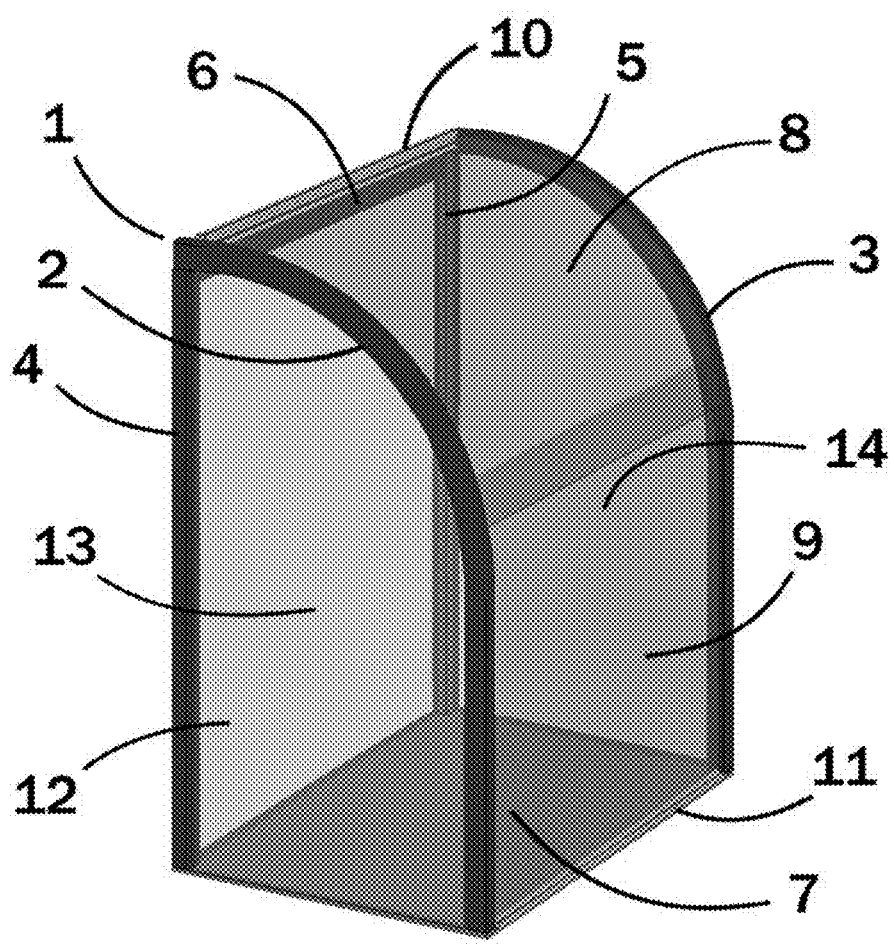
FIG. 1 is an orthogonal view of the present invention.

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The present invention is a stationary plant enclosure that incorporates a vertical rear face comprised of a plurality of rigid access panels, a front face comprised of a plurality of flexible access panels which curves at the top such that the rearward edge of the top of the curved face is co-located with the top edge of the rear face, a fixed vertical left face panel, a fixed vertical right face panel, and a solid horizontal bottom panel.

Referring to FIG. 1, an orthogonal view of the compact plant enclosure 1 is shown. The plant enclosure 1 has a frame that defines the bottom and as many as four other faces of the enclosure. The front and top of the enclosure are formed as a single curved face. The frame is comprised of a base 7 at the bottom, a left curved support 2, a right curved support 3, a left vertical support 4, a right vertical support 5, and a horizontal support 6 proximate the top of the plant enclosure 1. The face forming the front and top of the plant enclosure is comprised of an upper flexible access panel 8 connected to the left curved support 2 and right curved support 3, and a lower flexible access panel 9 which is also connected to the left curved support 2 and right curved support 3. Attached proximate the top edge of the upper flexible panel 8 is a handle 10 that provides means to open, close, and limit the travel of the upper flexible panel 8. Attached proximate the bottom of the lower flexible panel 9 is a handle 11 that provides means to open, close, and limit the travel of the lower flexible panel 9. The rear face of the plant enclosure is comprised of a rigid vertical panel 12 which is connected to the left vertical support 4 and the right vertical support 5. The left face is comprised of a fixed rigid left side panel 13 connected to the left curved support 2, the left vertical support 4, and the base 7. The right face is comprised of a fixed rigid side panel 14 connected to the right curved support 3, the right vertical support 5, and the base 7. The left and right faces are largely parallel to each other and perpendicular to the rear and front faces.

Figure 2:
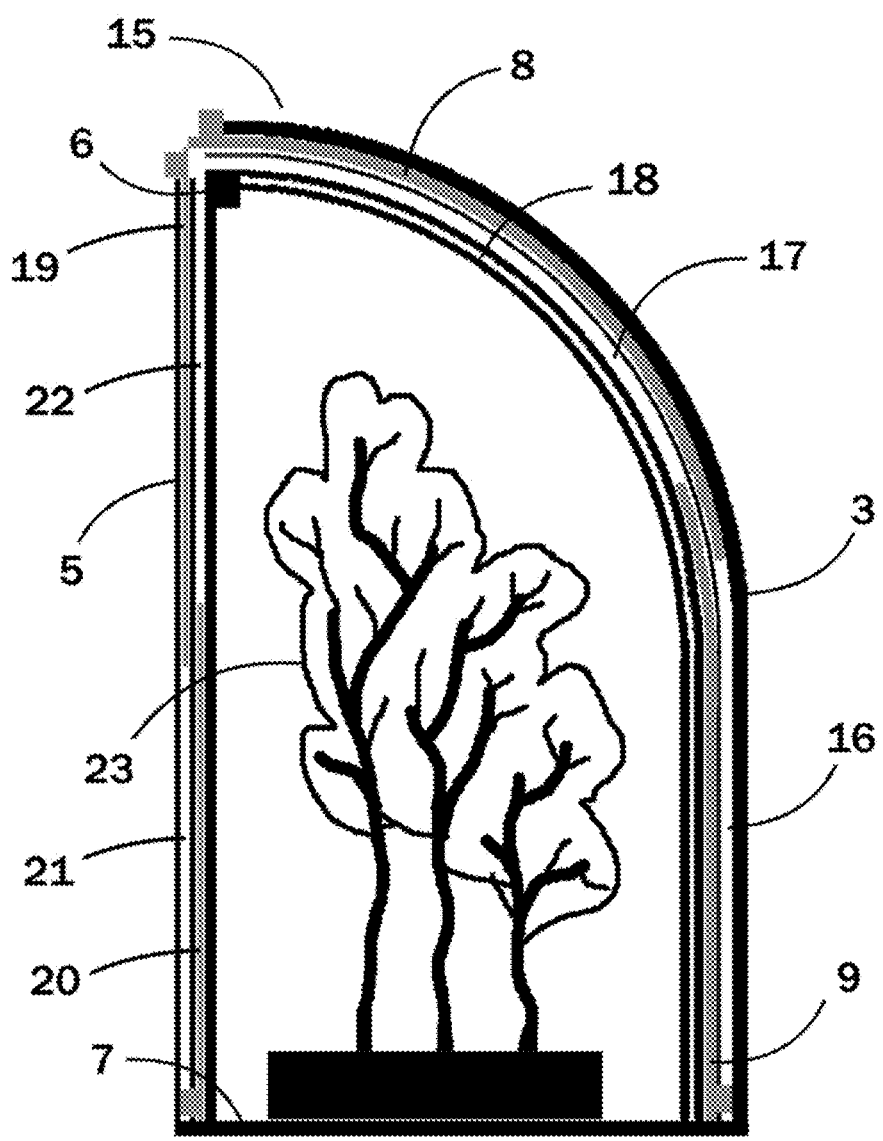
FIG. 2 is a cross-sectional side diagrammatic view of the present invention further comprising rear vertical access panels and in which the upper and lower flexible access panels and rigid rear access panels are in the closed position. It is understood that the configuration of the left curved support and left vertical support is a mirror of this diagrammatic representation of the right curved support and right vertical support.

Referring to FIG. 2, a side diagrammatic view of a vertical section through one form of the compact plant enclosure 15 further comprising an upper rear access panel 19 and a lower rear access panel 20 is shown. This view also includes a representative plant 23. In this view, the left side of the right curved support 3 and left side of the right vertical support 5 are shown in order to exemplify the structure of the present invention that affects its intended operation. An upper flexible panel guide channel 16 incorporated into the form of the right curved support 3 provides lateral restraint and longitudinal positioning for the upper flexible access panel 8. A lower flexible panel guide channel 17 located to the interior of the upper flexible panel guide channel 16 in the right curved support 3 provides lateral restraint and longitudinal positioning for the lower flexible access panel 9. The curved support flexible panel guide channels facilitate the movement and positioning of the flexible panels within the guide channels and along the path defined by the guide channels incorporated into the form of the curved supports. In this view, the upper flexible access panel 8 and lower flexible access panel 9 are in the closed position. Those practiced in the art will appreciate that the specific radius of the curved portion of the right curved support 3 is largely determined by the requirements of the enclosed plants 23, the mechanical bending radius limit of the flexible access panel material, the anticipated exterior environmental conditions, or the desired esthetics for the general shape. An upper rear access panel guide channel 21 incorporated into the form of the right vertical support 5 provides lateral restraint for the right-most edge of the upper rear access panel 19. A lower rear access panel guide channel 22 incorporated into the form of the right vertical support 5 provides lateral restraint for the right-most edge of the lower rear access panel 20. The vertical support rear panel guide channels facilitate the movement and positioning of the rear panels within the vertical support guide channels. In this view, the upper rear access panel 19 and lower rear access panel 20 are in the closed position. In this view is also shown an auxiliary channel 18 in the right curved support 3 which facilitates the harnessing of irrigation tubing or wiring for grow lights, pumps or other plant growing support systems.

Figure 3:
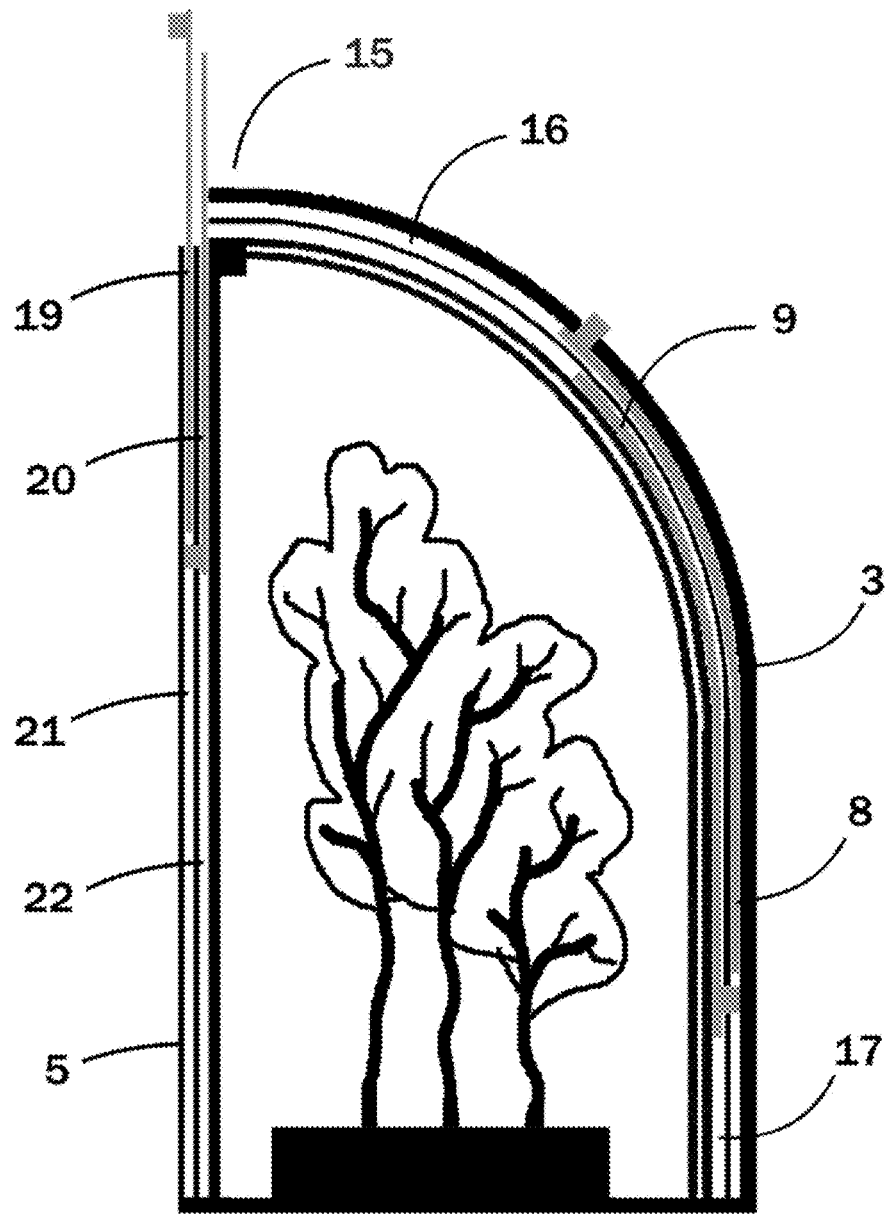
FIG. 3 is a cross-sectional side diagrammatic view of the present invention in which the upper and lower flexible access panels and rigid rear access panels are in an open position.

Referring to FIG. 3, a side diagrammatic view of a vertical section through the compact plant enclosure 15 is shown. In this view, the upper flexible access panel 8 and lower flexible access panel 9 are each in an open position located along their respective panel guide channels 16 and 17 incorporated into the form of the right curved support 3. In this view, the upper rear access panel 19 and lower rear access panel 20 are each in an open position located along their respective panel guide channels 21 and 22 incorporated into the form of the right vertical support. Those practiced in the art will appreciate that the specific size and number of flexible access panels and respective curved support guide channels may be more than two and are largely determined by the desired areas and locations of the access panel openings. Those practiced in the art will also appreciate that the specific size and number of rear access panels and respective vertical support guide channels may be more than two and are largely determined by the desired areas and locations of the access panel openings.

Figure 4:
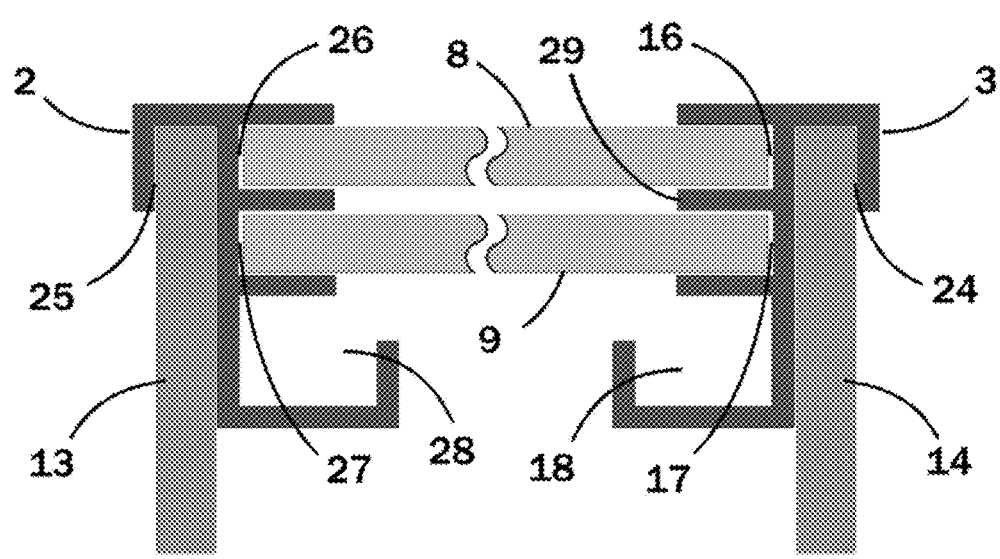
FIG. 4 is a cross-sectional front diagrammatic view proximate the top of the curved supports, the upper and lower flexible access panels, and fixed side panels of the present invention.

Referring to FIG. 4, a cross-sectional front diagrammatic view proximate the top of the present invention, including the left curved support 2, the right curved support 3, the upper flexible access panel 8, the lower flexible access panel 9, the fixed left side panel 13, and the fixed right side panel 14 is shown. The movement of the upper flexible panel 8 is limited laterally and radially on the left side by the left curved support upper flexible panel guide channel 26 and on the right side by the right curved support upper flexible panel guide channel 16. The movement of the lower flexible panel 9 is limited laterally and radially on the left side by the left curved support lower flexible panel guide channel 27 and on the right side by the right curved support lower flexible panel guide channel 17. The lower flexible panel guide channels 27 and 17 are located toward the interior of the two upper flexible panel guide channels 26 and 16, respectively. The upper and lower flexible panel guide channels are separated by a panel separation wall 29 incorporated into the figuration of each curved support. Auxiliary guide channels 28 and 18 are located to the interior adjacent the lower flexible panel guide channels 27 and 17, respectively. The edge of the fixed left side panel 13 is constrained by the left curved support fixed side panel groove 25. The edge of the fixed right side panel 14 is constrained by the right curved support fixed side panel groove 24.

Figure 5:
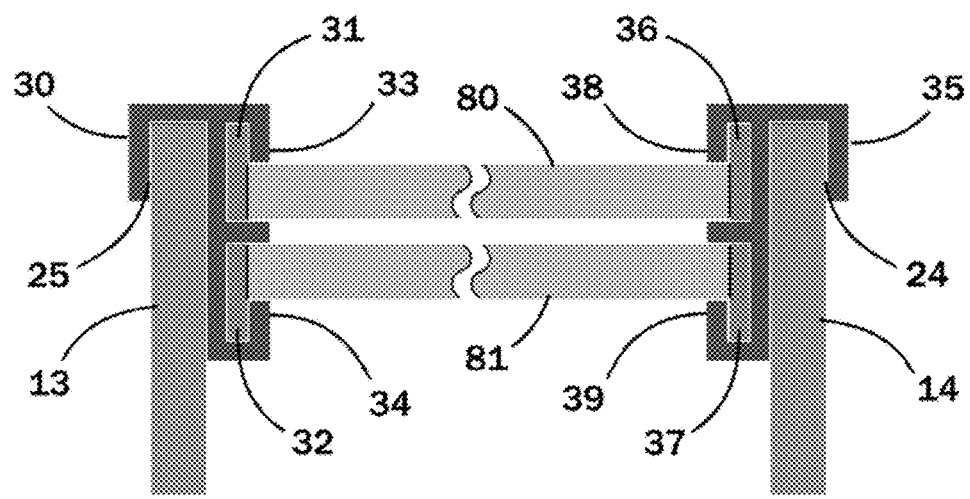
FIG. 5 is a cross-sectional front diagrammatic view proximate the top of one form of the curved supports and flexible access panels of the present invention in which a retainer feature is incorporated into the curved supports and the flexible access panels incorporate retention tabs that are partly bounded by the curved support retainer feature.

Referring to FIG. 5, a cross-sectional front diagrammatic view proximate the top of one form of the left curved support 30 and one form of the right curved support 35 of the present invention is shown in which an upper flexible panel retaining feature 33 and lower flexible panel retaining feature 34 are incorporated into the figuration of the left curved support 30 and an upper flexible panel retaining feature 38 and lower flexible panel retaining feature 39 are incorporated into the figuration of the right curved support 35. Also shown is the upper flexible access panel 80 further comprising upper left retention tabs 31 and upper right retention tabs 36. Also shown is the lower flexible access panel 81 further comprising lower left retention tabs 32 and lower right retention tabs 37. In this form of the present invention, upper left retention tabs 31 are attached perpendicularly to the left edge of the upper flexible panel 80 such that they extend toward the exterior of the enclosure and their exterior-most portions are located to the left of the left curved support exterior retainer 33 extension. The potential lateral movement of the upper flexible panel 80 in directions both toward and away from the left curved support 30 is limited by the guide channel formed by the left curved support exterior retainer 33 without inhibiting movement in a longitudinal direction along the guide channel path. In similar fashion, upper right retention tabs 36 are attached perpendicularly to the right edge of the upper flexible panel 80 such that they extend toward the exterior of the enclosure and their lateral movement both toward and away from the right curved support 35 is limited by the guide channel formed by the right curved support exterior retainer 38 without inhibiting movement in a longitudinal direction along the guide channel path. Lower left retention tabs 32 are attached perpendicularly to the left edge of the lower flexible panel 81 such that they extend toward the interior of the enclosure and their interior-most portions are located to the left of the left curved support interior retainer 34 extension. The potential lateral movement of the lower flexible panel 81 in directions both toward and away from the left curved support 30 is limited by the guide channel formed by the left curved support interior retainer 34 without inhibiting movement in a longitudinal direction along the guide channel path. In similar fashion, right retention tabs 37 are attached perpendicularly to the right edge of the lower flexible panel 81 such that they extend toward the interior of the enclosure and their lateral movement both toward and away from the right curved support 35 is limited by the guide channel formed by the right curved support interior retainer 39 without inhibiting movement in a longitudinal direction along the guide channel path. In this form of the invention, the limitation of lateral movement of the flexible panels with retention tabs imposed by the curved support retainers also limits the ability of the left side panel 13 constrained by the left curved support fixed side panel groove 25 and right side panel 14 constrained by the right curved support fixed side panel groove 24 to become non-parallel to each other. The specific method for attaching the retention tabs to the flexible panels may include, but not be limited to, insertion into or adhesion onto the edge of a flexible panel.

Figure 6:
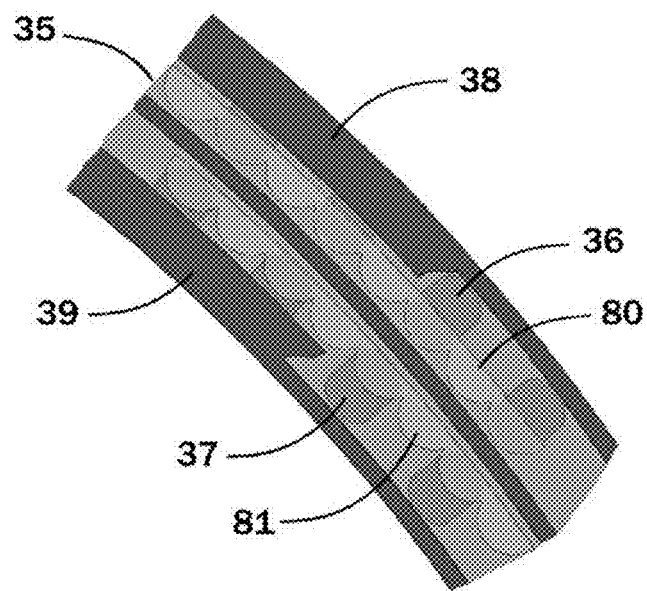
FIG. 6 is a cross-sectional side diagrammatic detail view of one form of the right curved support and flexible access panels of the present invention in which a retainer feature is incorporated into the curved support and the flexible access panels incorporate retention tabs that are partly bounded by the curved support retainer feature. It is understood that the configuration of the left curve support and flexible access panel edges is a mirror of this diagrammatic representation of a form of the right curved support and flexible access panel edges.

Referring to FIG. 6, a partial side diagrammatic view of a vertical detail section of the form of the right curved support and flexible access panels of the present invention in which an exterior flexible panel retainer feature 38 and interior flexible panel retainer feature 39 are incorporated into the figuration of the right curved support is shown. A form of an upper flexible panel 80 and a form of a lower flexible panel 81 are shown in which the thickness of each panel is varied in a periodic fashion in order to facilitate an adequately small radius bending along the arc of the curved support. Those practiced in the art will appreciate that the specific type and extent of variation in the thickness of a panel are dictated by the desired stiffness of a panel in the direction of the curved support guide channel direction and the radius of the curved support. A form of the upper panel right retention tabs 36 is shown in which they are discrete elements attached at the right edge of the upper flexible panel 80, perpendicular to the flexible panel, and extending toward the exterior of the enclosure and to the right of the extended portion of the exterior retainer 38 incorporated into the figuration of the right curved support 35. A form of the lower panel right retention tabs 37 is shown in which they are discrete elements attached at the right edge of the upper flexible panel 81, perpendicular to the flexible panel, and extending toward the interior of the enclosure and to the right of the extended portion of the interior retainer 39 incorporated into the figuration of the right curved support 35. The specific spacing of the retention tabs is generally unlimited; however, those practiced in the art will appreciate that specific spacing of the retention tabs is dictated by a particular application.

Figure 7:
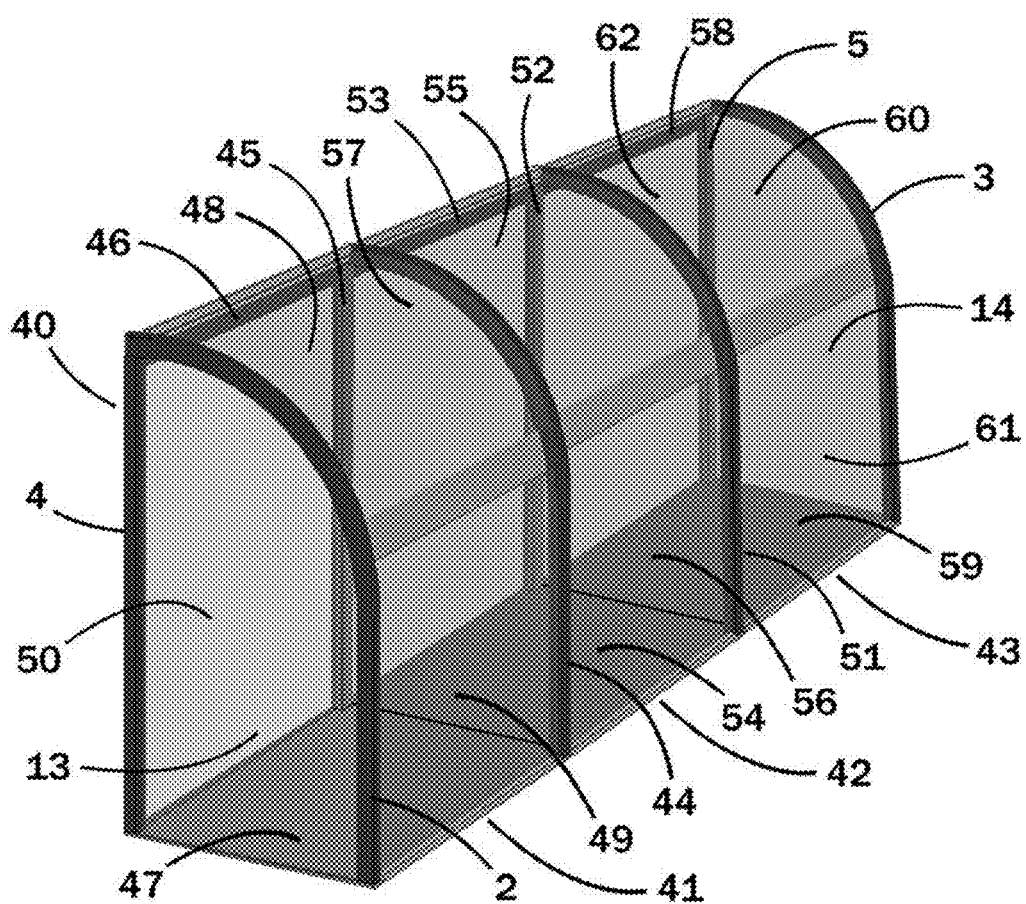
FIG. 7 is an orthogonal view of another form of the present invention in which multiple distinct intermediate segments of the present invention are defined by interstitial curved supports located between adjacent sets of flexible access panels and interstitial vertical supports co-planar with the interstitial curved supports are located between adjacent rear panels.

Referring to FIG. 7, shown is an orthogonal view of another form of the plant enclosure 40 in which interstitial supports are further incorporated into the structure of the compact plant enclosure to form a frame defining a left-most segment 41, a middle segment 42, and a right-most segment 43. In this form of the plant enclosure, the left-most segment 41 is comprised of a left-most segment base 47 at the bottom, a left curved support 2, a left interstitial curved support 44, a left vertical support 4, a left interstitial vertical support 45, a left-most horizontal support 46, a left-most upper flexible access panel 48 connected to the left curved support 2 and left interstitial curved support 44, and a left-most lower flexible access panel 49 which is also connected to the left curved support 2 and left interstitial curved support 44. The rear face of the left-most segment 41 is comprised of a rigid vertical panel 50 which is connected to the left vertical support 4 and the left interstitial vertical support 45. The left face of the left-most segment is comprised of a fixed rigid left side panel 13 connected to the left curved support 2, the left vertical support 4, and the left-most segment base 47. In this form of the plant enclosure, the middle segment 42 is comprised of a middle segment base 54 at the bottom, a left interstitial curved support 44, a right interstitial curved support 51, a left interstitial vertical support 45, a right interstitial vertical support 52, a middle horizontal support 53, a middle upper flexible access panel 55 connected to the left interstitial curved support 44 and right interstitial curved support 51, and a middle lower flexible access panel 56 which is also connected to the left interstitial curved support 44 and right interstitial curved support 51. The rear face of the middle segment 42 is comprised of a rigid vertical panel 57 which is connected to the left interstitial vertical support 45 and the right interstitial vertical support 52. The left side of the middle segment 42 is open to the left-most segment 41 and the right side of the middle segment 42 is open to the right-most segment 43. In this form of the plant enclosure, the right-most segment 43 is comprised of a right-most segment base 59 at the bottom, a right interstitial curved support 51, a right curved support 3, a right interstitial vertical support 52, a right vertical support 5, a right-most horizontal support 58, a right-most upper flexible access panel 60 connected to the right interstitial curved support 51 and a right curved support 3, and a right-most lower flexible access panel 61 which is also connected to the right interstitial curved support 51 and a right curved support 3. The rear face of the right-most segment 43 is comprised of a rigid vertical panel 62 which is connected to the right interstitial vertical support 52 and the right vertical support 5. The right face of the right-most segment is comprised of a fixed rigid right side panel 14 connected to the right curved support 3, the right vertical support 5, and the right-most segment base 59. The number of additional interstitial segments that may be incorporated into the configuration of a specific plant enclosure between the left-most segment and right-most segment is generally unlimited.

Figure 8:
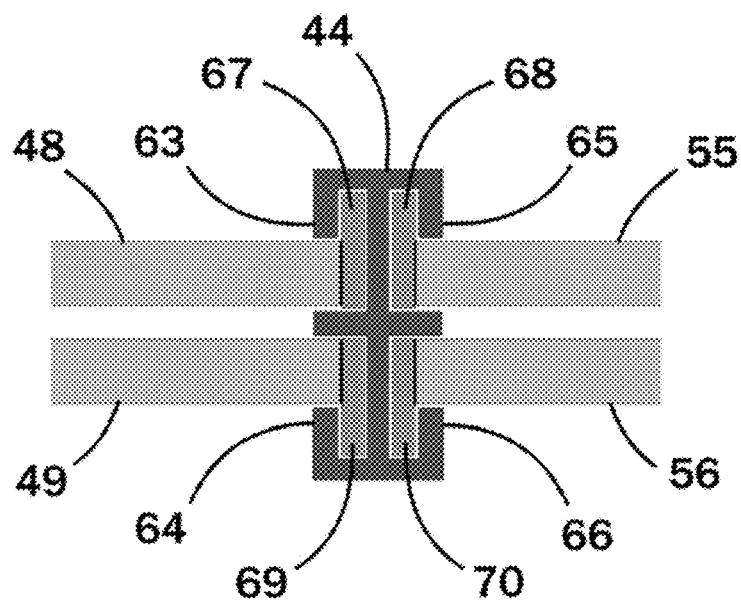
FIG. 8 is a cross-sectional front diagrammatic view proximate the top of a form of an interstitial curved support and flexible access panels of the present invention in which a retainer feature is incorporated into the interstitial curved support and the flexible access panels incorporate retention tabs that are partly bounded by the interstitial curved support retainer feature.

Referring to FIG. 8, a cross-sectional front diagrammatic view proximate the top of one form of an interstitial curved support 44 and flexible access panels of the present invention is shown in which an upper flexible panel retaining feature 63 and a lower flexible panel retaining feature 64 are incorporated into the figuration of the left side of an interstitial curved support 44 and an additional upper flexible panel retaining feature 65 and an additional lower flexible panel retaining feature 66 are incorporated into the figuration of the right side of the interstitial curved support 44. In this form of the present invention, right retention tabs 67 are attached perpendicularly to the right edge of an upper flexible panel 48 such that they extend toward the exterior of the enclosure and their exterior-most portions are located to the right of the left exterior retainer 63 extension. The potential lateral movement of the upper flexible panel 48 in directions both toward and away from the interstitial curved support 44 is limited by the guide channel formed by the left exterior retainer 63 without inhibiting movement in the longitudinal direction of the guide channel path. In similar fashion, left retention tabs 68 are attached perpendicularly to the left edge of an additional upper flexible panel 55 such that they extend toward the exterior of the enclosure and their lateral movement both toward and away from the interstitial curved support 44 is limited by the guide channel formed by the right exterior retainer 65 without inhibiting movement in the longitudinal direction of the guide channel path. Right retention tabs 69 are attached perpendicularly to the right edge of the lower flexible panel 49 such that they extend toward the interior of the enclosure and their interior-most portions are located to the right of the left interior retainer 64 extension. The potential lateral movement of the lower flexible panel 49 in directions both toward and away from the interstitial curved support 44 is limited by the guide channel formed by the left interior retainer 64 without inhibiting movement in the longitudinal direction of the guide channel path. In similar fashion, left retention tabs 70 are attached perpendicularly to the left edge of an additional lower flexible panel 56 such that they extend toward the interior of the enclosure and their lateral movement both toward and away from the interstitial curved support 44 is limited by the guide channel formed by the right interior retainer 66 without inhibiting movement in the longitudinal direction of the guide channel path.

Figure 9:
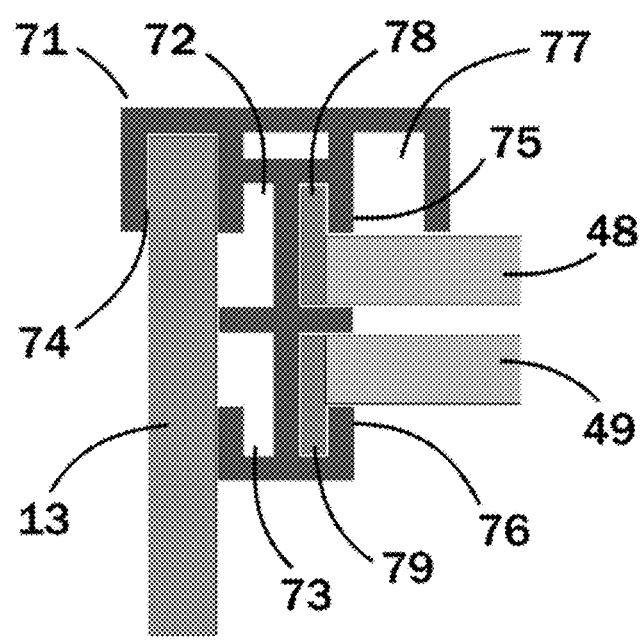
FIG. 9 is a cross-sectional front diagrammatic view proximate the top of another form of a curved support of the present invention in which flexible access panel retainer features and a side panel retention groove are incorporated into both opposing sides of the curved support.

Referring to FIG. 9, a cross-sectional front diagrammatic view proximate the top of another form of a curved support 71 of the present invention is shown in which the features required for support and retention of upper and lower flexible panels with retention tabs as well as a fixed side panel exist on both the left and right side of a curved support such that it can function as an interstitial curved support as well as a side curved support. The multipurpose curved support 71 incorporates into its figuration a left exterior retention channel 72, a left interior retention guide channel 73, a left fixed panel groove 74, a right exterior retention guide channel 75, a left interior retention guide channel 76, and a right fixed panel groove 77. In this view, the multi-purpose curved support 71 functions as a left curved support with the right exterior retention channel 75 supporting and retaining the leftmost edge of an upper flexible panel 48 with attached retention tabs 78, the right interior retention guide channel 76 supporting and retaining the leftmost edge of a lower flexible panel 49 with attached retention tabs 79, and the left fixed panel groove 74 constraining a fixed left side panel 13. It is understood that a multipurpose curved support 71 functioning as a right curved support utilizes the left exterior retention guide channel 72 to support and retain the rightmost edge of an upper flexible panel with attached retention tabs, the left interior retention guide channel 73 to support and retain the rightmost edge of a lower flexible panel with attached retention tabs, and a fixed panel groove 77 to constrain a fixed right side panel. It is also understood that a multipurpose curved support 71 functioning as an interstitial curved support utilizes the left exterior retention guide channel 72 to support and retain the rightmost edge of an upper flexible panel with attached retention tabs, the left interior retention guide channel 73 to support and retain the rightmost edge of a lower flexible panel with attached retention tabs, the right exterior retention guide channel 75 to support and retain the leftmost edge of an upper flexible panel with attached retention tabs, and the right interior retention guide channel 76 to support and retain the leftmost edge of a lower flexible panel with attached retention tabs.

The overall dimensions and shape of the plant enclosure in all its forms are generally unlimited; however, those practiced in the art will appreciate that specific dimensions are dictated by a particular application.

The enclosure frame and retention elements of the present invention can be constructed of a wide range of solid materials including but not limited to high density thermoplastics, thermoset composites, various insulated metals, rigid porous media, ceramics, or wood. The flexible and fixed panels of the present invention can be constructed of a wide range of solid translucent or translucent materials including but not limited to clear or tinted high density thermoplastics or glass. Those practiced in the art will appreciate that each of the components described can be formed individually or by assembling multiple forms of sub-components. Individual components or sub-components can be formed through a variety of techniques including but not limited to extrusion, injection molding, casting, or milling as dictated by the specific application.

Specific examples of applications of the present invention include plant enclosures where a controlled environment of limited height and peripheral clearance is desired for conventional or hydroponic gardening or farming located on building rooftops, balconies, decks, patios, parking lots or other locations where container gardening or farming is preferred over traditional in-ground methods.

It should be emphasized that the above-described embodiments of the present invention, particularly any "preferred" embodiments, are merely possible examples of implementations, setting forth for a clear understanding of the principles of the invention. Many variations and modifications may be made to the above-described embodiments of the invention without substantially departing from the spirit and principles of the invention. All such modifications are intended to be included herein within the scope of this disclosure and the present invention.

I claim:

1. An enclosure for sheltering plants comprising:
   a first generally vertical support frame component extending from a first end to a second end and having a bottom portion and a top portion;
   a second generally vertical support frame component extending from a first end to a second end and having a bottom portion and a top portion;
   a first generally horizontal support frame component extending from a first end to a second end and having the first end connected to the top portion of the first vertical support and having the second end connected to the top portion of the second vertical support;
   a first generally curved support frame component extending from a first end to a second end and having a generally vertical lower portion, a generally arced middle portion, and a generally horizontal top portion connected to the top portion of the first vertical support;
   a second generally curved support frame component extending from a first end to a second end and being generally parallel to and proportional to the first curved support, having a generally vertical lower portion, a generally arced middle portion, and a generally horizontal top portion connected to the top portion of the second vertical support;
   a first generally horizontal base panel extending from a first end to a second end and having the first end connected proximate a first vertex to the bottom portion of the first vertical support as well as having the first end connected proximate a second vertex to the bottom portion of the second vertical support and having the second end connected proximate a third vertex to the bottom of the lower portion of the first curved support as well as having the second end connected proximate a fourth vertex to the bottom of the lower portion of the second curved support;

a first generally vertical, rectangular translucent panel extending from a first end to a second end and having a generally vertical first side portion connected to the first vertical support, and a generally vertical second side portion connected to the second vertical support;

a first generally vertical, translucent, fixed panel extending from a first end to a second end and having a generally horizontal bottom portion connected to the first base panel, a generally vertical first side portion connected to the first vertical support, and a generally curved second side portion connected to the vertical lower portion, arced middle portion, and horizontal top portion of the first curved support;

a second generally vertical, translucent, fixed panel extending from a first end to a second end and having a generally horizontal bottom portion connected to the first base panel, a generally vertical first side portion connected to the second vertical support, and a generally curved second side portion connected to the vertical lower portion, arced middle portion, and horizontal top portion of the second generally curved support;

a first plurality of translucent access panels that are generally flexible in a direction longitudinal to the first and second curved support frames and generally rigid in the direction perpendicular to the first and second generally vertical, translucent, fixed panels attached to the curved supports, each extending from a first end to a second end and each having a first side portion connected to the vertical lower portion, arced middle portion, or horizontal top portion of the first curved support and having a second side portion connected to the vertical lower portion, arced middle portion, or horizontal top portion of the second curved support corresponding to the longitudinal position of the first side portion;

a first plurality of guide channels incorporated into an interior-most portion of the first curved supports at the locations where the first plurality of access panels connect to the first curved support such that the guide channels facilitate the longitudinal positioning of and restrain the lateral movement of the first plurality of access panels along a path defined by a length of the first curved supports;

a second plurality of guide channels incorporated into an interior-most portion of the second curved supports at the locations where the access panels connect to the second curved supports such that the guide channels facilitate the longitudinal positioning of and restrain the lateral movement of the access panels along a path defined by a length of the second curved support; and a handle attached proximate one end of each of the first plurality of flexible access panels with which to provide a means of sliding the access panel along the path dictated by the guide channels incorporated into the forms of the first curved support and second curved support, thus allowing an opening to be created between an interior and exterior of the enclosure or affecting the complete or partial closing of said opening.

2. An enclosure according to claim 1 further comprising:

a third generally vertical support frame component located adjacent the second vertical support and generally co-planar with the first and second vertical supports;

a third generally curved support frame component extending from a first end to a second end and being generally proportional to and parallel to the first and second curved supports, having a generally vertical lower portion, a generally arced middle portion, and a generally horizontal top portion connected to the top portion of the third vertical support;

a second generally horizontal support frame component extending from a first end to a second end and having the first end connected proximate the top portion of the third vertical support and a second end connected proximate the top portion of the second vertical support;

a second generally horizontal base panel extending from a first end to a second end and having the first end connected proximate a first vertex to the bottom portion of the third vertical support as well as having the first end connected proximate a second vertex to the bottom portion of the second vertical support and having the second end connected proximate a third vertex to the bottom of the lower portion of the third curved support as well as having the second end connected proximate a fourth vertex to the bottom of the lower portion of the second curved support;

a second generally vertical rectangular translucent panel extending from a first end to a second end and having a generally vertical first side portion connected to the third vertical support, and a generally vertical second side portion connected to the second vertical support;

a third generally vertical, translucent, fixed panel extending from a first end to a second end and having a generally horizontal bottom portion connected to the second base panel, a generally vertical first side portion connected to the third vertical support, and a generally curved second side portion connected to the vertical lower portion, arced middle portion, and horizontal top portion of the third generally curved support;

a second plurality of translucent flexible access panels each extending from a first end to a second end and each having a first side portion connected to the vertical lower portion, arced middle portion, or horizontal top portion of the third curved support and having a second side portion connected to the vertical lower portion, arced middle portion, or horizontal top portion of the second curved support corresponding to the longitudinal position of the first side portion;

a plurality of guide channels incorporated into the form of the third curved support at the locations where the second plurality of flexible access panels connect to the third curved support such that the guide channels facilitate the longitudinal positioning of and restrain the lateral movement of the second plurality of flexible access panels along a path defined by a length of the third curved support;

a corresponding plurality of guide channels incorporated into the second curved support at the locations where the second plurality of access panels connect to the second curved support such that the guide channels facilitate the longitudinal positioning of and restrain the lateral movement of the second plurality of access panels along a path defined by a length of the second curved support; and a handle attached proximate one end of each of the second plurality of flexible access panels with which to provide a means of sliding each flexible access panel along the path dictated by the guide channels incorporated into the form of the third curved support and second curved support, thus allowing an opening to be created between the interior and exterior of the enclosure or affecting the complete or partial closing of said opening in a manner distinct from that of the first plurality of flexible access panels.

3. An enclosure according to claim 1 or 2 further comprising additional lateral restraints of the translucent flexible panels wherein the lateral restraints are in the form of:
each guide channel incorporated into the form of each curved support frame component further comprises a perpendicular retaining extension of an outermost wall of the channel such that it extends in the general direction of an innermost wall of the channel;
each flexible access panel further comprises a plurality of retention tabs attached to an edge of the first side portion and an edge of an second side portion of the flexible access panel where the flexible access panel connects to the respective curved support guide channel such that the retention tabs extend perpendicularly to the flexible access panel and in a direction generally opposite that of the curved support guide channel retaining extensions; and
each retention tab extension is located between the respective guide channel retaining extension and parallel to an opposing wall of the guide channel thus restraining lateral movement of the retention tabs and flexible panels along both non-longitudinal axes at a given point along the path of the guide channel.

4. An enclosure according to claim 1 or 2 wherein:
the form of each curved support frame component incorporates a groove that constrains the second side portion of the respective vertical, translucent, fixed panel; and
the form of each vertical support frame component incorporates a groove that constrains the first side portion of the respective vertical, translucent, fixed panel.

5. An enclosure according to claim 1 or 2 wherein the form of each curved support frame component incorporates a longitudinal auxiliary channel.

6. An enclosure for sheltering plants comprising:
a first generally vertical side wall comprising a first generally vertical support frame component extending from a first end to a second end and having a bottom portion and a top portion, a first generally curved support frame component extending from a first end to a second end and having a generally vertical lower portion, a generally arced middle portion, and a generally horizontal top portion connected to the top portion of the first vertical support, and a first generally vertical, translucent, fixed panel extending from a first end to a second end and having a generally vertical first side portion connected to the first vertical support, and a generally curved second side portion connected to the vertical lower portion, arced middle portion, and horizontal top portion of the first curved support;
a second generally vertical side wall that is proportional to and generally parallel to the first side wall and comprising a second generally vertical support frame component extending from a first end to a second end and having a bottom portion and a top portion, a second generally curved support frame component extending from a first end to a second end and having a generally vertical lower portion, a generally arced middle portion, and a generally horizontal top portion connected to the top portion of the second vertical support, and a second generally vertical, translucent, fixed panel extending from a first end to a second end and having a generally vertical first side portion connected to the vertical support, and a generally curved second side portion connected to the vertical lower portion, arced middle portion, and horizontal top portion of the second curved support;
a plurality of interstitial generally vertical support frame components each being generally proportional to the first and second vertical supports and located between and generally co-planar with the first and second vertical supports;
a plurality of interstitial curved support frame components each being generally proportional to the first and second curved supports, having a generally vertical lower portion, a generally arced middle portion, and a generally horizontal top portion connected to the top portion of the respective interstitial vertical support and being located between and generally parallel to the first curved support and the second curved support;
a plurality of generally horizontal support frame components each extending from a first end to a second end and each having the first end connected proximate the top portion of the respective interstitial vertical support, or the first or second vertical support, and a second end connected proximate the top portion of an adjacent one of the vertical supports;
a plurality of generally horizontal base panels each extending from a first end to a second end and each having the first end connected proximate a first vertex to the bottom portion of the respective interstitial vertical support, or the first or second vertical support, as well as having the first end connected proximate a second vertex to the bottom portion of an adjacent one of the vertical supports, and having the second end connected proximate a third vertex to the bottom of the lower portion of the respective interstitial curved support, or the first or second curved support, as well as having the second end connected proximate a fourth vertex to the bottom of the lower portion of an adjacent one of the curved supports;
a plurality of generally vertical rectangular translucent panels each extending from a first end to a second end and each having a generally vertical first side portion connected to the respective interstitial vertical support, or the first or second vertical support, and a generally vertical second side portion connected to an adjacent one of the vertical supports;
a plurality of translucent flexible access panels each extending from a first end to a second end and each having a first side portion connected to the vertical lower portion, arced middle portion, or horizontal top portion of the respective interstitial curved support, or the first or second curved support, and having a second side portion connected to the corresponding vertical lower portion, arced middle portion, or horizontal top portion of an adjacent one of the curved supports;
a plurality of guide channels incorporated into the form of the first curved support at the locations where the flexible access panels connect to the first curved support such that the guide channels facilitate the longitudinal positioning of and restrain the lateral movement of the flexible access panels along a path defined by a length of the first curved support;
a plurality of guide channels incorporated into the form of the second curved support at the locations where the flexible access panels connect to the second curved support such that the guide channels facilitate the longitudinal positioning of and restrain the lateral movement of the flexible access panels along a path defined by a length of the second curved support; curved support; and a plurality of guide channels incorporated into the form of each interstitial curved support at the locations where the flexible access panels connect to the interstitial curved support such that the guide channels facilitate the longitudinal positioning of and restrain the lateral movement of the flexible access panels along a path defined by a length of the interstitial a plurality of handles each attached proximate one end of each flexible access panel with which to provide a means of sliding each flexible access panel along the path dictated by the guide channels incorporated into the form of each curved support and the corresponding adjacent curved support, thus allowing an opening to be created between an interior and exterior of the enclosure or affecting the complete or partial closing of said opening.

7. An enclosure according to claim 6 further comprising additional lateral restraints of the translucent flexible panels wherein the lateral restraints are in the form of:

each guide channel incorporated into the form of each curved support frame component further comprises a perpendicular retaining extension of an outermost wall of the channel such that it extends in the general direction of an innermost wall of the channel;

each flexible access panel further comprises a plurality of retention tabs attached to an edge of the first side portion and an edge of the second side portion of the flexible access panel where the flexible access panel connects to the respective curved support guide channel such that the retention tabs extend perpendicularly to the flexible access panel and in a direction generally opposite that of the curved support guide channel retaining extensions; and each retention tab extension is located between the respective guide channel retaining extension and parallel to an opposing wall of the guide channel thus restraining lateral movement of the retention tabs and flexible panels along both non-longitudinal axes at a given point along the path of the guide channel.

8. An enclosure according to claim 7 in which the form of each curved support incorporates:

a plurality of flexible access panel guide channels on a first planar side of the curved support;

a groove on the first planar side portion of the curved support that can constrain the second side portion of the corresponding vertical fixed panel;

a plurality of flexible access panel guide channels on a second planar side of the curved support; and a groove on the second planar side of the curved support that can constrain the second side portion of the corresponding vertical fixed panel such that each curved support can be utilized interchangeably with the other curved supports.

9. An enclosure according to claim 6 wherein:

the form of each curved support frame component incorporates a groove that constrains the second side portion of the respective vertical, translucent, fixed panel; and the form of each vertical support frame component incorporates a groove that constrains the first side portion of the respective vertical, translucent, fixed panel.

10. An enclosure according to claim 6 wherein the form of each curved support frame component incorporates a longitudinal auxiliary channel.

* * * * *